(12) United States Patent
Mollick et al.

(10) Patent No.: US 9,689,611 B2
(45) Date of Patent: Jun. 27, 2017

(54) LOCKING CAM STOP

(71) Applicant: Gencor Industries, Inc., Orlando, FL (US)

(72) Inventors: Joseph T. Mollick, Longwood, FL (US); William D. Gulley, Orlando, FL (US)

(73) Assignee: GENCOR INDUSTRIES, INC., Orlando, FL (US)

( * ) Notice: Subject to any disclaimer, the term of this patent is extended or adjusted under 35 U.S.C. 154(b) by 166 days.

(21) Appl. No.: 14/683,544

(22) Filed: Apr. 10, 2015

(65) Prior Publication Data

US 2016/0054062 A1    Feb. 25, 2016

Related U.S. Application Data

(60) Provisional application No. 62/039,558, filed on Aug. 20, 2014.

(51) Int. Cl.
| | |
|---|---|
| *F26B 11/04* | (2006.01) |
| *F27B 7/26* | (2006.01) |
| *F27B 7/22* | (2006.01) |
| *F16H 25/18* | (2006.01) |

(52) U.S. Cl.
CPC ............. *F27B 7/26* (2013.01); *F16H 25/186* (2013.01); *F26B 11/04* (2013.01); *F27B 7/22* (2013.01); *F27B 7/2206* (2013.01); *F27B 2007/222* (2013.01); *F27B 2007/265* (2013.01)

(58) Field of Classification Search
CPC .... F26B 5/00; F26B 7/00; F26B 11/00; F26B 11/04; F27B 2007/222; F27B 2007/265; F27B 7/22; F27B 7/26; F27B 7/2206; F16H 25/186; B65D 90/623; B65D 83/06; F23C 1/10; F23C 11/00; F23K 5/00

USPC ......... 34/60, 90; 294/68.24; 414/808; 431/8, 431/9; 110/264, 265
See application file for complete search history.

(56) References Cited

U.S. PATENT DOCUMENTS

| | | | | |
|---|---|---|---|---|
| 1,780,148 | A * | 10/1930 | Sprague ................. | B61L 3/121 200/8 R |
| 1,838,617 | A * | 12/1931 | Goldberg ....................... | 235/1 C |
| 2,049,256 | A * | 7/1936 | Golber ..................... | B26D 1/06 83/174 |
| 2,131,683 | A * | 9/1938 | Basquin ................ | G01G 23/18 177/3 |

(Continued)

FOREIGN PATENT DOCUMENTS

| | | |
|---|---|---|
| CN | 104061783 | 9/2014 |
| WO | WO 95/34792 | 12/1995 |

OTHER PUBLICATIONS

Extended European Search Report dated Jan. 27, 2016 issued in European Patent Application No. 15181835.8, 8 pp.

*Primary Examiner* — Stephen M Gravini
(74) *Attorney, Agent, or Firm* — Nixon & Vanderhye P.C.

(57) ABSTRACT

A locking cam stop conducts rotation from a driving part, such as a tire ring, to a driven part, such as a rotary dryer or kiln. The device utilizes clamping cams with logarithmic profiles to secure the tire ring without welding or direct attachment, only frictional force. The cams provide immediate, powerful holding force in the desired direction, while allowing free counter-rotation when necessary. The device utilizes a tension link to maintain sufficient contact with the tire ring, ensuring that the cams will engage and hold the tire ring when necessary.

16 Claims, 3 Drawing Sheets

(56) References Cited

U.S. PATENT DOCUMENTS

| | | | | |
|---|---|---|---|---|
| 2,164,324 A | * | 7/1939 | Harrington | G07C 3/00 340/287 |
| 2,842,832 A | * | 7/1958 | Chase | H01J 19/46 445/33 |
| 2,943,906 A | * | 7/1960 | Thomas | G05B 19/4202 346/17 |
| 3,516,175 A | * | 6/1970 | Fagan | G09B 5/062 369/53.4 |
| 3,561,304 A | | 2/1971 | Bachmann | |
| 4,380,844 A | * | 4/1983 | Waldhauser | A47L 11/30 15/320 |
| 4,492,002 A | * | 1/1985 | Waldhauser | A47L 11/30 15/320 |
| 4,516,334 A | | 5/1985 | Wanke | |
| 4,656,759 A | | 4/1987 | Yamato | |
| 4,668,185 A | | 5/1987 | Taylor | |
| 4,770,236 A | | 9/1988 | Kulikowski | |
| 4,916,831 A | | 4/1990 | Yasumura et al. | |
| 4,964,226 A | | 10/1990 | Gobel | |
| 5,197,204 A | | 3/1993 | Christensen | |
| 5,251,791 A | * | 10/1993 | van Leer | B65D 50/04 220/319 |
| 5,305,533 A | | 4/1994 | Alexander et al. | |
| 5,581,902 A | | 12/1996 | Didion et al. | |
| 5,746,006 A | | 5/1998 | Duske et al. | |
| 5,996,245 A | | 12/1999 | Yamato | |
| 6,052,917 A | | 4/2000 | Matsumoto | |
| 6,578,741 B2 | * | 6/2003 | Ritsche | B05B 11/0027 128/200.23 |
| 8,601,711 B2 | | 12/2013 | Kim | |
| 8,961,393 B2 | * | 2/2015 | Rion | A61F 5/0053 600/37 |
| 2004/0149103 A1 | | 8/2004 | Rundell et al. | |
| 2012/0227389 A1 | * | 9/2012 | Hinderks | F01B 1/10 60/317 |
| 2016/0054062 A1 | * | 2/2016 | Mollick | F16H 25/186 432/103 |

\* cited by examiner

LOCKING CAM STOP

CROSS-REFERENCES TO RELATED APPLICATIONS

This application claims the benefit of U.S. Provisional Patent Application Ser. No. 62/039,558, filed Aug. 20, 2014, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

A rotary dryer/kiln is a type of industrial dryer that is used to reduce the moisture content in various materials. They are often used in the processing of cement, iron ore, limestone, plus many materials. Typical rotary dryers/kilns include a cylindrical shell that is inclined slightly in the horizontal and supported by a set of ride rings or tire rings that rest upon rollers. The contents of the dryer are heated, while the dryer is slowly rotated about its axis by rotational motion applied to the system through one of many different methods.

In one configuration, a force is applied to a tire ring through power applied to the rollers. The tires should be linked to the dryer in the radial direction and in the circumferential direction.

A typical dryer tire ring is made of a cast or forged medium carbon steel, which is machined to a smooth cylindrical surface and then hardened. It is loosely attached to the dryer/kiln shell by some variety of radial suspension methods. Several such methods exist, as some creativity is required to design for the required weight and varying load, while also allowing for thermal expansion. If a driving force needs to be conducted through the tire ring, the dryer and tire ring must be linked circumferentially, and in such a way that doesn't compromise the intent of the radial suspension. Additionally, it would be ideal for the circumferential connection method to allow free counter-rotation. Occasional, but sudden, "loaded stops" can potentially add unneeded stress to the system, if the tire ring and dryer are hard linked and slippage is not permitted to occur.

Welding to the tire ring is not ideal, as the steels used are typically not easily weldable and can be susceptible to residual stress cracking. To properly weld and treat, this material requires furnace heat treatments after welding, which can get rather costly, considering the size of the material, or may not even be feasible depending on the design and assembly order of the dryer.

Another design alternative involves the addition of a separate gear-type ring attached at a cooler part of the dryer tube. The gear is then connected though a gear train to an electric motor. This drive type adds significantly more complexity to the system, increasing cost (parts, labor, and maintenance) and the possibility for complications or failure.

BRIEF SUMMARY OF THE INVENTION

The device according to the described embodiments was designed to meet this need and transfer the required force. It will secure the rotary dryer to its tire ring, in the direction of rotation, with minimal impact on the tire ring itself. The device utilizes clamping cams with logarithmic profiles to secure the tire ring without welding or direct attachment, only frictional force. The cams provide immediate, powerful holding force in the desired direction, while allowing free counter-rotation when necessary. The device utilizes a spring to maintain sufficient contact with the tire ring, ensuring that the cams will engage and hold the tire ring when necessary.

In an exemplary embodiment, a locking cam stop conducts rotation from a driving part, such as a tire ring, to a driven part, such as a rotary drum or dryer or kiln. The locking cam stop includes a pair of riser blocks securable to the driven part, and a pair of rotatable cams, one each secured to each of the pair of riser blocks. A tension link is connected between the pair of rotatable cams. The rotatable cams include a logarithmic spiral cam profile, and the rotatable cams are displaceable in an axial direction into engagement with the driving part by rotation according to the logarithmic spiral cam profile.

The pair of rotatable cams may be positioned on axial opposite sides of the driving part. The tension link may urge the locking cams toward each other. Preferably, the tension link includes a spring. The locking cams may be rotatable on posts respectively secured in the pair of riser blocks. Additionally, functional surfaces of the rotatable cams may be roughened.

In another exemplary embodiment, a rotary dryer assembly includes a rotary drum supported for rotation about a longitudinal axis, a tire ring disposed surrounding the rotary drum, and the locking cam stop of the described embodiments that conducts rotation from the tire ring to the rotary drum.

In yet another exemplary embodiment, a locking cam stop for conducting rotation from a tire ring to a rotary drum includes a pair of rotatable cams disposed on opposite sides of the tire ring, where the rotatable cams include a logarithmic spiral cam profile. A tension link is connected between the pair of rotatable cams and includes a spring that urges the rotatable cams toward each other. The rotatable cams are displaceable in an axial direction into engagement with the driving part by rotation according to the logarithmic spiral cam profile. The tension link may be disposed offset from a plane defined by cam surfaces of the rotatable cams.

BRIEF DESCRIPTION OF THE DRAWINGS

These and other aspects and advantages will be described in detail with reference to the accompanying drawings, in which.

DETAILED DESCRIPTION OF THE INVENTION

Figure 3:
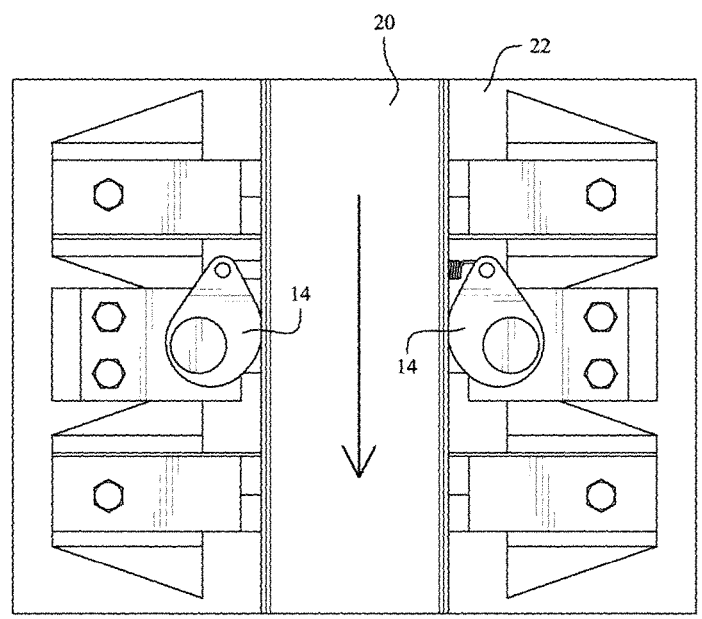
FIG. 3 is a plan view of a locking cam stop conducting rotation from a tire ring to a rotary dryer.

With reference to the drawings, a locking cam stop 10 includes a pair of riser blocks 12 that may be secured to a driven part, such as a rotary dryer, in one or more locations. One each of a pair of rotatable cams 14 is secured to each of the riser blocks 12. As shown in FIG. 3, the cams 14 are positioned on axial opposite sides of a driving part or tire ring 20. The cams 14 are rotatable on a post 16 cooperable with the riser blocks 12. The rotatable cams are provided with a logarithmic spiral cam profile.

Figure 1:
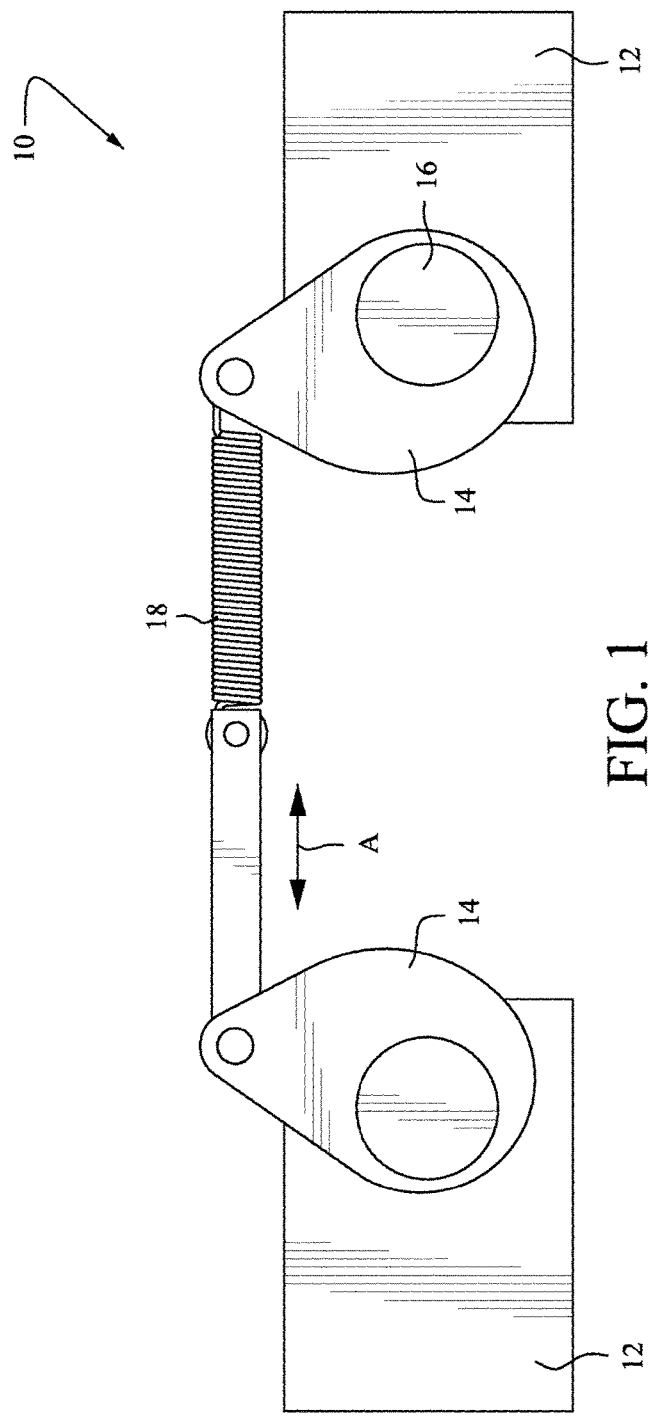
FIG. 1 is a plan view of the locking cam stop according to the described embodiments.

A tension link 18 is connected between the pair of rotatable cams 14. The tension link 18 preferably includes a spring or other elastic member and acts to pull the rotatable cams 14 toward each other. The rotatable cams 14 are displaceable in an axial direction (A in FIG. 1) into engagement with the driving part by rotation according to the logarithmic spiral cam profile.

A roughening process such as linear knurling or the like may be added to the functional services of the cams 14 to ensure that a sufficient frictional surface is present. The assembly is designed so that it may be installed on existing dryers or retrofit to older designs.

In operation, rotational force is applied to the tire ring 20 in a direction perpendicular to the assembly. Friction between the tire ring 20 and the cams 14 translates the tire ring 20 applied force into a normal force, resulting in a clamping action on the sides of the tire ring 20. The cams 14 provide sufficient frictional force to hold the tire ring 20 relative to the assembly and ensure that the rotary drum 22 rotates with the tire ring 20. This may be accomplished by designing the assembly so that each cam 14 contacts the tire ring 20 at a calculated angle, based on the coefficient of friction between the respective materials (e.g., steel-on-steel). Per Amontons's First Law of Friction, the force of friction is directly proportional to the applied load. Utilizing the equation for frictional force and calculations determined by a free body diagram of the system, a direct relationship between coefficient of friction and maximum cam angle can be determined. The final cam angle is determined with safety factor considerations, maximum resultant load calculations, and experimentation.

The logarithmic spiral cam profile guarantees that the desired cam angle is always met. A logarithmic spiral is a spiral such that the angle between the tangent and the radius vector is the same for all points of the spiral. In polar coordinates (r, $\Theta$), the logarithmic curve can be written as: $r=ae^{b\Theta}$, where r is the distance from the origin, $\Theta$ is the angle from the x-axis, and a and b are arbitrary constants. At any chosen point along the spiral, the tangent and radial vectors create the same angle between them ($\alpha$, alpha). This establishes that at any point along the logarithmic surface, a mechanism translating force through tangential contact will be exerting that force at the same angle, relative to the center of the spiral; and therefore, the magnitude of the force will be same, regardless of contact location.

In the designed cam 14, the post 16 is placed at the center of the logarithmic spiral, so that as the cam 14 rotates, the cam face follows the logarithmic curvature. This ensures that the cam 14 will always contact the tangent surface of the tire ring 20 at the same angle, regardless of radial distance (within the designed range of the cam). In other words, the distance between the cam post 16 and the tire 20 is non-critical and can be adjusted, and the results will not be affected. This profile will allow for installation error, tire defects, cam wear, etc., and still provide the same required holding force.

Figure 2:
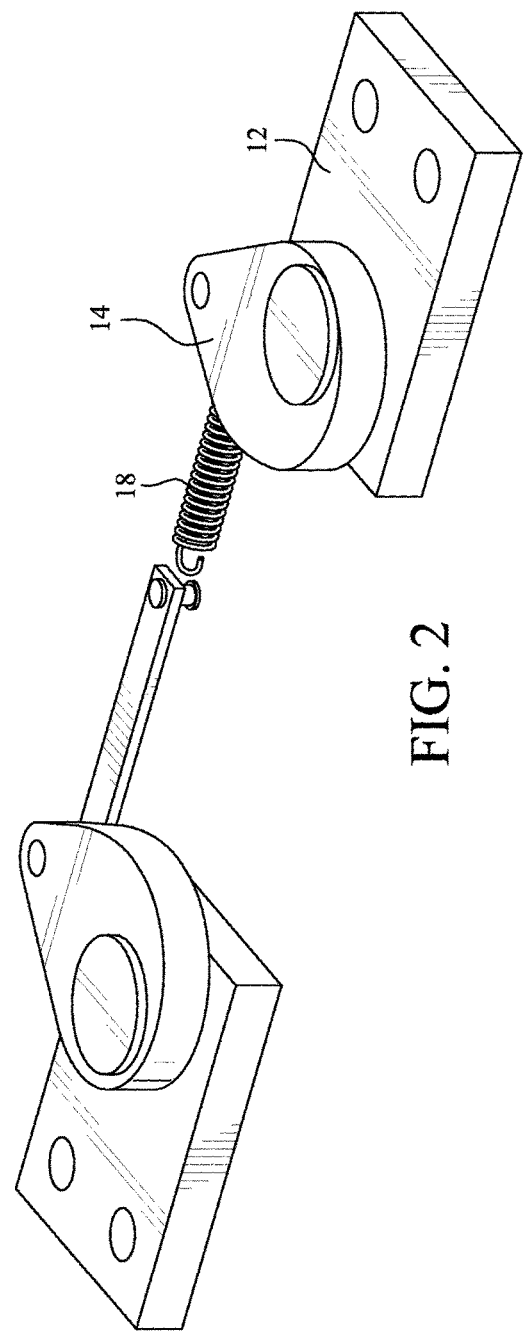
FIG. 2 is a perspective view of the locking cam stop.

As shown in FIG. 2, the tension link 18 is disposed offset from a plane defined by the cam surfaces of the rotatable cams 14. Preferably, the tension link 18 is positioned on an underside of the cams 14 so that the driving part or tire ring 20 is positioned in the space between the cam surfaces.

The locking cam stop thus secures a driven part, such as a rotary drum, to a driving part, such as a tire ring, in the direction of rotation. In the rotary dryer example, the assembly is attached to the drum, and when force is applied to the tire ring, the assembly will hold the tire ring, pulling the drum around with it. The device can provide release of the tire ring and allow it to "slip," relative to the drum if counter-rotational motion occurs. The device thus allows a slow and dampened stop, rather than abrupt, reducing the possibility for added stress and damage. Installation direction is dependent on the direction of drum rotation.

The device secures the rotary drum to its tire ring using frictional force. In the exemplary embodiment, the assembly makes contact by steel pressed against steel with no welding or other direct attachment to the tire ring. The friction between the two objects will hold the tire ring with a force proportional to the rotational force of the tire ring.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A locking cam stop for conducting rotation from a driving part to a driven part, the locking cam stop comprising:
   a pair of riser blocks securable to the driven part;
   a pair of rotatable cams, one each secured to each of the pair of riser blocks; and
   a tension link connected between the pair of rotatable cams,
   wherein the rotatable cams include a logarithmic spiral cam profile, and wherein the rotatable cams are displaceable in an axial direction into engagement with the driving part by rotation according to the logarithmic spiral cam profile, wherein when the rotatable cams are engaged with the driving part, the driven part is rotated by the driving part.

2. A locking cam stop according to claim 1, wherein the pair of rotatable cams are positioned on axial opposite sides of the driving part.

3. A locking cam stop according to claim 2, wherein the tension link urges the locking cams toward each other.

4. A locking cam stop according to claim 1, wherein the tension link urges the locking cams toward each other.

5. A locking cam stop according to claim 1, wherein the tension link comprises a spring.

6. A locking cam stop according to claim 1, wherein the locking cams are rotatable on posts respectively secured in the pair of riser blocks.

7. A locking cam stop according to claim 1, wherein functional surfaces of the rotatable cams are roughened.

8. A rotary drum assembly comprising:
   a rotary drum supported for rotation about a longitudinal axis;
   a tire ring disposed surrounding the rotary drum; and
   a locking cam stop that conducts rotation from the tire ring to the rotary drum, the locking cam stop including:
      a pair of riser blocks securable to the rotary drum,
      a pair of rotatable cams, one each secured to each of the pair of riser blocks, and
      a tension link connected between the pair of rotatable cams,
   wherein the rotatable cams include a logarithmic spiral cam profile, and wherein the rotatable cams are displaceable in an axial direction into engagement with the tire ring by rotation according to the logarithmic spiral cam profile, wherein when the rotatable cams are engaged with the tire ring, the rotary drum is rotated by the tire ring.

9. A rotary drum assembly according to claim 8, wherein the pair of rotatable cams are positioned on axial opposite sides of the driving part.

10. A rotary drum assembly according to claim 9, wherein the tension link urges the locking cams toward each other.

11. A rotary drum assembly according to claim 8, wherein the tension link urges the locking cams toward each other.

12. A rotary drum assembly according to claim 8, wherein the tension link comprises a spring.

13. A rotary drum assembly according to claim 8, wherein the locking cams are rotatable on posts respectively secured in the pair of riser blocks.

14. A rotary drum according to claim 8, wherein functional surfaces of the rotatable cams are roughened.

15. A locking cam stop for conducting rotation from a tire ring to a rotary drum, the locking cam stop comprising:
    a pair of rotatable cams disposed on opposite sides of the tire ring, wherein the rotatable cams include a logarithmic spiral cam profile; and
    a tension link connected between the pair of rotatable cams, the tension link including a spring that urges the rotatable cams toward each other,
    wherein the rotatable cams are displaceable in an axial direction into engagement with a driving part by rotation according to the logarithmic spiral cam profile.

16. A locking cam stop according to claim 15, wherein the tension link is disposed offset from a plane defined by cam surfaces of the rotatable cams.

* * * * *